(12) United States Patent
Le Roy et al.

(10) Patent No.: US 9,586,623 B2
(45) Date of Patent: Mar. 7, 2017

(54) MOTOR VEHICLE ARRANGEMENT HAVING A THREE-ELEMENT WATER BOX

(71) Applicant: RENAULT s.a.s., Boulogne-Billancourt (FR)

(72) Inventors: Julien Le Roy, Versailles (FR); Emmanuel Barreiro, Villiers le Mahieu (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/376,538

(22) PCT Filed: Jan. 30, 2013

(86) PCT No.: PCT/EP2013/051768
§ 371 (c)(1),
(2) Date: Aug. 4, 2014

(87) PCT Pub. No.: WO2013/120692
PCT Pub. Date: Aug. 22, 2013

(65) Prior Publication Data
US 2014/0375084 A1    Dec. 25, 2014

(30) Foreign Application Priority Data
Feb. 13, 2012 (FR) .................................. 12 51318

(51) Int. Cl.
*B62D 25/08* (2006.01)
*B62D 25/13* (2006.01)
(Continued)

(52) U.S. Cl.
CPC ............. *B62D 25/081* (2013.01); *B60H 1/28* (2013.01); *B60R 13/07* (2013.01)

(58) Field of Classification Search
CPC ........ B60H 1/28; B60R 13/07; B62D 25/081; B62D 25/10
(Continued)

(56) References Cited

U.S. PATENT DOCUMENTS 4,883,309 A * 11/1989 Miyazaki et al. ....... 296/193.09

FOREIGN PATENT DOCUMENTS

DE    10 2006 029 921 A1    1/2008
FR     2 874 577 A1    3/2006
(Continued)

OTHER PUBLICATIONS

French to English translation of FR 2,965,240; retreived Aug. 4, 2015 via PatentTranslate on the EPO website, www.epo.org.*
(Continued)

*Primary Examiner* — Jason S Daniels
(74) *Attorney, Agent, or Firm* — Oblon, McClelland, Maier & Neustadt, L.L.P.

(57) ABSTRACT

An arrangement including elements of a motor vehicle body on which hood mountings are mounted, and a water box which extends transversely to the longitudinal direction of the vehicle, and at ends of which water is discharged. The water box includes a central element, and two end elements for closing the water box which are connected to the central element and through which the water is discharged. Each end element extends toward an inside of the vehicle in a direction transverse to the vehicle body, beyond an inner edge of each corresponding hood mounting, such that the central element can pass between the hood mountings when mounting the central element along a path substantially lying in a plane vertical and longitudinal to the vehicle body.

10 Claims, 4 Drawing Sheets

(51) Int. Cl.
*B60H 1/28* (2006.01)
*B60R 13/07* (2006.01)

(58) Field of Classification Search
USPC .............................. 296/192, 193.03, 193.11
See application file for complete search history.

(56) References Cited

FOREIGN PATENT DOCUMENTS

FR  2 899 554 A1  10/2007
FR  2965240 A1 *  3/2012

OTHER PUBLICATIONS

International Search Report issued Apr. 17, 2013, in PCT/EP13/051768 filed Jan. 30, 2013.

* cited by examiner

MOTOR VEHICLE ARRANGEMENT HAVING A THREE-ELEMENT WATER BOX

TECHNICAL FIELD OF THE INVENTION

The invention concerns an arrangement including elements of a motor vehicle body such as A pillar liners and/or lateral fender liners on which hood supports are mounted, the arrangement further including a water box adapted to collect water flowing over the windshield of the vehicle and to separate it from air to be routed into a ventilation circuit of the vehicle, the water box having the general shape of a gutter extending transversely to the longitudinal direction of the vehicle, at the ends of which the water is discharged.

The invention also has for subject matter a method of mounting a water box in such an arrangement.

PRIOR ART

In a motor vehicle there is provided at the bottom of the front windshield a structure commonly referred to as a "water box" essentially intended to collect running water flowing off the windshield and to separate the water from the air notably for ventilating the passenger compartment.

The water box has the general shape of a gutter the open side of which faces upward and is closed by a cowl grille. It conventionally includes a front rim having an upward-facing upper edge (rebate) on which a seal is mounted. On closing the hood, the hood liner (which is a stiffening element disposed on the interior side of the hood) comes to bear on and cooperate with this seal to separate the engine compartment from the interior space of the water box in a relatively watertight manner.

In current solutions, the water box is produced in one piece over all its length considered in a longitudinal direction of the water box, this direction often being oriented in a direction transverse to the vehicle.

There is more and more frequently severe congestion in the upper part of the engine compartment. Fitting a one-piece water box becomes very difficult, implying difficult access for tools, notably screwing tools, necessitating numerous precise manipulations of the water box because of the limited access. Depending on the architecture, fitting sometimes becomes impossible in practice. This problem is particularly real when two bulky hood support elements intended to support the hood providing access to the engine compartment are disposed on either side of the water box in the longitudinal direction of the water box in a direction transverse to the body of the vehicle. In effect, if these hood supports protrude toward the interior of the engine compartment (for example to enable nesting or insertion without hinges), they form an obstacle constraining the fitting of the water box. These hood supports are referred to as protruding inwards in the sense that they penetrate into the interior space of the engine compartment in the direction transverse to the vehicle.

Additionally, the water box must frequently be fitted above a windshield wiper mechanism fixed previously, for example on a firewall upper crossmember. The windshield wiper spindles then pass through openings in the water box provided for this purpose within the thickness of the water box. The windshield wiper spindles are inscribed in vertical planes substantially perpendicular to the curve formed by the firewall upper crossmember (this curve is formed by the shape of the lower edge of the windshield and the bay interior crossmember). Fitting the water box is therefore subject to the constraint of having to pass the windshield wiper spindles through the water box via orifices provided for this purpose. The water box is moved along a path substantially inscribed in a vertical plane that is longitudinal with reference to the longitudinal direction of the vehicle (the (X, Z) plane as defined hereinafter). This arrangement prevents any movement of the water box in the direction transverse to the vehicle (sideways movement in the direction Y defined hereinafter), which limits the ease of fitting the water box, in particular when it is necessary to avoid such hood supports in order to position the water box under them.

There is therefore a real need to provide a solution enabling easy fitting of the water box independently of the architecture of and congestion in the upper part of the engine compartment.

OBJECT OF THE INVENTION

The aim of the present invention is to propose an arrangement that eliminates the drawbacks listed above.

One object of the invention is notably to provide an arrangement enabling secure and easy fitting of the water box independently of congestion in and the architecture of the upper part of the engine compartment of the motor vehicle.

A first aspect of the invention concerns an arrangement including elements of a body of a motor vehicle, such as A pillar liners and/or lateral fender liners on which hood supports are mounted, the arrangement further including a water box adapted to collect water flowing over the windshield of the vehicle and to separate it from air to be routed into a ventilation circuit of the vehicle, the water box having the general shape of a gutter extending transversely to the longitudinal direction of the vehicle, at the ends of which water is discharged. The water box includes on the one hand a central element and two end elements for closing the water box connected to the central element by which water is discharged, each end element extending toward the interior of the vehicle, along a direction transverse to the body of the vehicle, beyond the interior edge of each corresponding hood support, in order to allow the central element to pass between the hood supports when mounting the central element along a path substantially inscribed in a vertical plane longitudinal with respect to the body of the vehicle.

The central element may bear at each of its ends on an upper face of each corresponding end element, the overlap zone extending at least 7 mm along the direction transverse to the vehicle. The overlap zone may be at most 20 mm, notably 10 mm, along the direction transverse to the vehicle.

Each end element may have a dimension along the transverse direction Y that is less than 150 mm, notably less than 100 mm.

The ratio of the lengths of the central element and each end element may be greater than 10, these lengths being considered in the direction transverse to the body of the vehicle.

The central element and the end elements may be made of plastic material.

Sealing means may be provided between the central element and the end elements and/or the central element and a firewall upper crossmember of the vehicle to which it is fixed, notably by at least one screw extending in a plane perpendicular to the direction transverse to the vehicle and/or the end elements and the body elements to which they are fixed.

Each end element may be fixed to a corresponding end of the central element by at least one screw engaged with these two elements.

Each end element may be in one piece with a hood support retaining one lateral edge of the hood or separate from any hood support.

Each end element may include, on the side directed toward the body element to which it is fixed, a concave shape adapted to channel in the transverse direction the outflow from the water box of water collected by the central element.

A second aspect of the invention concerns a method of mounting a water box in such an arrangement, including a step of fixing each of the two end elements for closing the water box to an adjacent body element, such as an A pillar liner and/or a lateral fender liner, followed by a step of fixing the central element for closing the water box, the central element being moved when mounting it along a path inscribed in a plane perpendicular to the transverse direction of the body of the vehicle.

BRIEF DESCRIPTION OF THE DRAWINGS

Other advantages and features will emerge more clearly from the following description of particular embodiments of the invention given by way of nonlimiting example and represented in the appended drawings, in which.

DESCRIPTION OF PREFERRED EMBODIMENTS OF THE INVENTION

Figure 1:
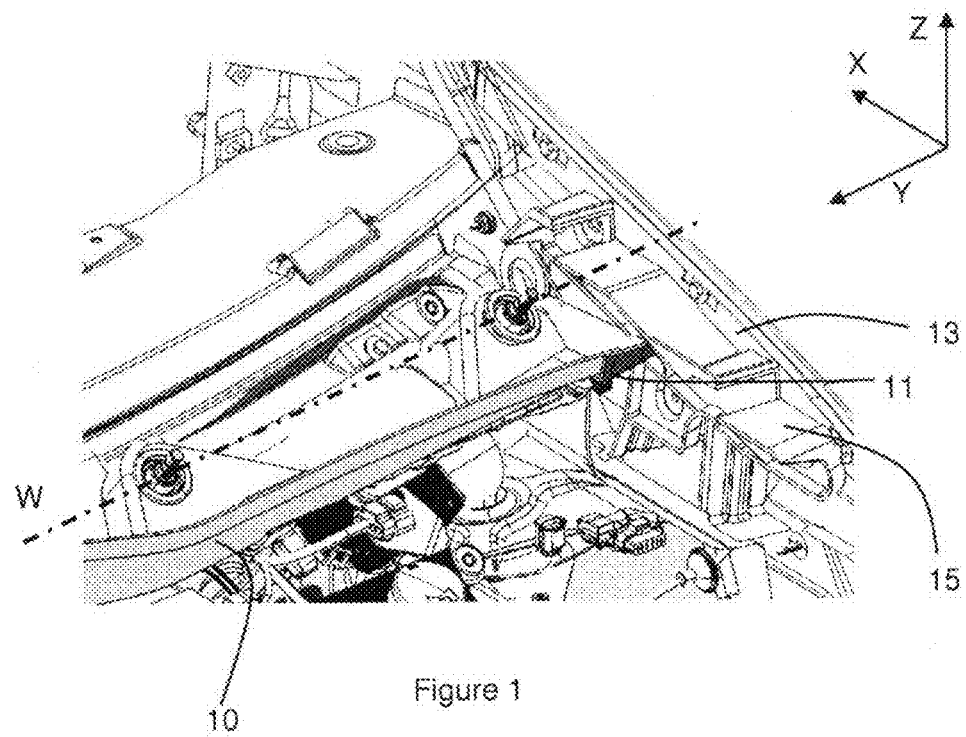
FIG. 1 is a general view in perspective of a first example of an arrangement in accordance with the invention including a first embodiment of the water box.

The description is given with reference to an orthonormal system of axes (X, Y, Z) conventionally associated with a motor vehicle, in which X is the front-to-rear longitudinal direction of the vehicle directed toward the rear, Y is the right-to-left transverse direction that is horizontal and perpendicular to X and directed toward the right, and Z is the vertical direction directed upward.

In the figures, an arrangement for motor vehicles is represented with a water box intended to be mounted on a body of the motor vehicle. This water box essentially includes on the one hand a central closure element 10 adapted to collect water flowing over the windshield of the vehicle and to separate it from air to be routed into a ventilation circuit of the vehicle. The water box has the general shape of a gutter extending transversely (in the direction Y) to the longitudinal direction X of the vehicle. Water in the water box is guided in a longitudinal direction W of the water box. The water box essentially includes on the other hand two end closure elements 11 fixed to the opposite longitudinal ends of the central element 10. Conventionally, although not exclusively, the longitudinal direction W of the water box, corresponding to the overall direction of the flow of water along its largest dimension, is oriented parallel to the direction Y transverse to the vehicle.

Each of the end elements 11 includes means for fixing it to an associated body element, which fixing means may be demountable. As a function of the architecture of the upper part of the engine compartment, the end elements may be fixed to any body elements, for example a liner of an A pillar 12 of the chassis of the vehicle and/or a liner of a lateral fender 13. These elements to be fixed to the body elements may be of any kind, such as screwing means, snap-fastening means or equivalent means. The end elements 11 may include at least one opening 18 intended to have a screw fastened to the associated body element or engaged in the latter passed through it subsequently. It may alternatively consist of a nut and bolt system.

Thanks to the arrangement of such fixing elements at the level of the end elements 11, the water box may advantageously be mounted on the body in two stages:

firstly by fixing each of the two end elements 11 to an associated element of the body such as a liner of an A pillar 12 and/or a liner of a lateral fender 13, then by fixing the central element 10 to the end elements 11 previously fixed to the body.

Thus the central element 10 is initially fixed at each of its longitudinal ends to the corresponding end element 11, for example by means of at least one fixing screw located in a front zone (with reference to the direction X).

To ensure better retention of the central element 10 after it is fixed to the end elements 11, it includes elements for fixing it to at least one associated element of the body such as a firewall upper crossmember 14. These elements for fixing the central element 10 to the body notably consist of at least one screw that is preferably inclined to the horizontal. For example, the central element 10 is fixed to the crossmember 14 by means of four screws distributed along the transverse direction Y. The crossmember 14 has an inclined bearing surface on which the central element 10 and the end elements 11 bear. The screws pass through openings formed within the thickness of the central element 10 and are fixed to the crossmember 14. They are oriented on a slant and each has its axis inscribed in a respective vertical plane locally perpendicular to the curved shape of the firewall upper crossmember 14 (because of the shape of the lower portion of the windshield and the front edge of the firewall lower crossmember). The screws are slanted toward the front and upward along Z, enabling easy access by the fitting machine without the lower edge of the windshield vertically above it impeding this operation.

By virtue of an appropriate organization of the central elements and the end closure elements, the fixing of the central element 10 may advantageously include a step of placing the central element 10 on the end elements 11 by moving the central element 10 along a path substantially inscribed in a plane (X, Z) that by definition is perpendicular to the transverse direction Y of the body of the vehicle. The size of the end elements 11 along the longitudinal direction W of the water box may advantageously be made as small as possible while the length of the central element 10 in this direction W may be made as large as possible. The choice of these sizes must nevertheless allow fitting of the central element 10 along a path substantially inscribed within a plane (X, Z) of movement between the two supports 15 dedicated to supporting a hood providing access to the engine compartment and to this end disposed on respective opposite sides of the water box in the longitudinal direction W of the water box, i.e. here in the transverse direction Y.

Each end element 11 therefore extends toward the interior of the vehicle, along a direction Y transverse to the body of the vehicle, beyond the interior edge of each corresponding hood support 15, in order to allow the central element 10 to pass between the hood supports 15 when mounting the central element 10 along the path substantially inscribed in a vertical plane (X, Z) longitudinal with respect to the body of the vehicle. By "the interior edge of a support" is meant the edge of the support located toward the interior of the vehicle, i.e. closest to the longitudinal and vertical median plane of the vehicle.

It is then necessary, where possible, to limit the congestion resulting from the presence of the end elements 11. The ratio between the longitudinal dimension of the central element 10 (considered along the longitudinal direction W of the water box, here along the direction Y) and the longitudinal dimension of each of the end elements 11 (also considered along the longitudinal direction W of the water box, here along the direction Y) is greater than 10. In other words, the ratio of the lengths of the central element 10 and each of the end elements 11 is greater than 10, these lengths being considered along the direction Y transverse to the body of the vehicle. For example, each end element 11 has a dimension along the transverse direction Y that is less than 150 mm, notably less than 100 mm.

This facilitates fitting the water box, for example to the firewall upper crossmember 14, above a windshield wiper mechanism fixed previously. The windshield wiper spindles then pass through openings provided for this purpose within the thickness of the central element 10 of the water box. This arrangement therefore circumvents the impossibility of moving the water box along the direction Y transverse to the vehicle, in particular when it is necessary to avoid the supports 15 to place the water box under them.

Figure 7:
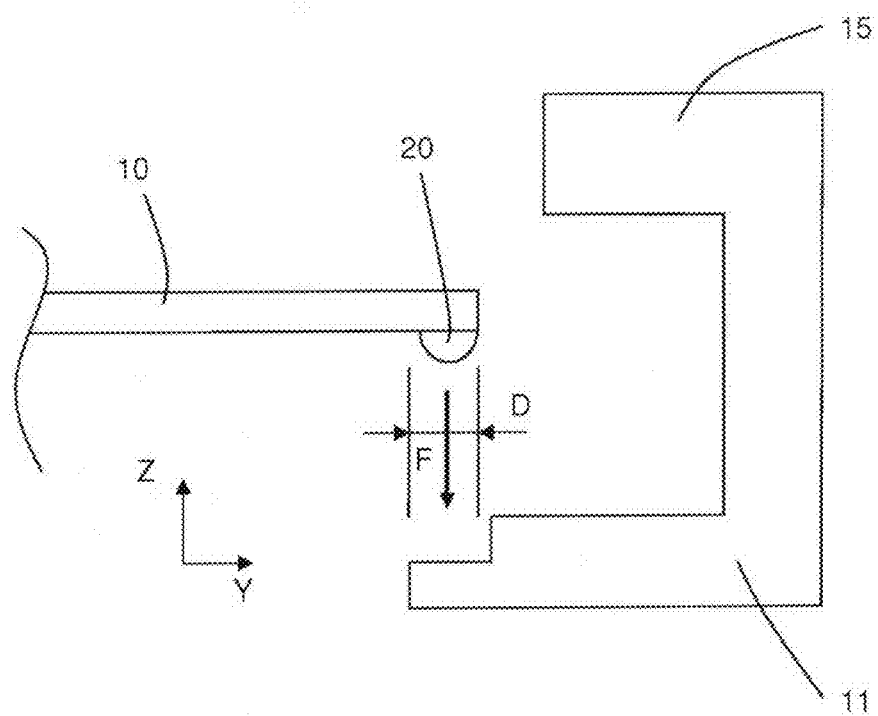
FIG. 7 represents diagrammatically in vertical cross section the mounting of the water box in the second example.

Each end of the central element 10 advantageously bears in the direction W on an upper face of each corresponding end element 11. On placing the central element 10 on the end elements 11, the overlapping ends of the central element 10 are applied from above in the direction Z (arrow F in FIG. 7). As a result, the central element 10 overlies the end elements 11, encouraging natural sideways outflow of the water. The overlapping zone or distance D (FIG. 7) is at least 7 mm along the direction Y transverse to the vehicle. The overlapping zone D is at most 20 mm, notably 10 mm, along the direction Y transverse to the vehicle.

To ensure reliable connection of the central element 10 to the end elements 11, each end element 11 is fixed to a corresponding end of the central element 10 by at least one screw engaged with these two elements.

In one embodiment, the central element 10 and the end elements 11 are made of plastic material. Plastic has the advantage of being insensitive to corrosion and of enabling accurate sizing of its thickness in order to respond to constraints in respect of absorption of impact with pedestrians.

The water box further includes waterproofing means, for example in the form of seals, notably applied by means of a gun, between:

the central element 10 and the end elements 11; this sealing means 20 (FIG. 7) is compressed on fixing the central element 10 to the end elements 11; and/or the central element 10 and the body element to which it is fixed (here the firewall upper crossmember 14); this sealing means is compressed on fixing the central element 10 to the crossmember 14; and/or the end elements 11 and the body elements to which they are fixed (here the A pillar liner 12 and/or the lateral fender liner 13); this sealing means is compressed on fixing the end elements 11 to the associated body elements.

The arrangement may include other waterproofing means, such as a compressible rubber seal, consisting of one or more parts arranged end to end and fitted onto the upper rebate of the water box, at the level of both the central element 10 and the end elements 11 for closing the water box. This seal is intended to be compressed by the hood liner that comes into bearing engagement with it when the hood is closed to isolate the engine compartment from the interior space of the water box.

Figure 2:
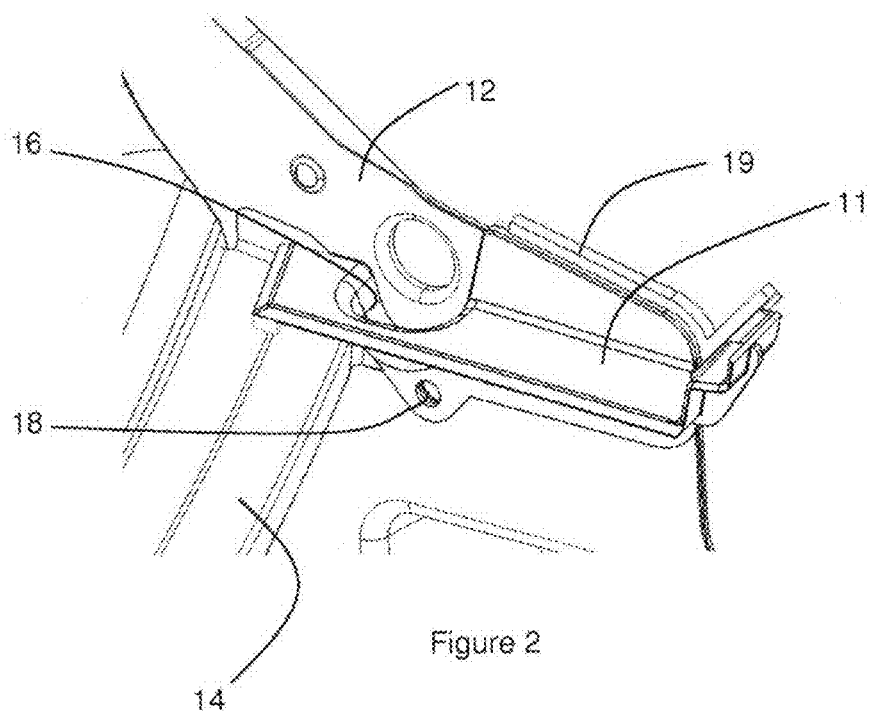
FIGS. 2 to 4 are views of details of the arrangement from FIG. 1, FIGS. 5 and 6 show part of a second embodiment of the water box for a second example of an arrangement in accordance with the invention.
Figure 3:
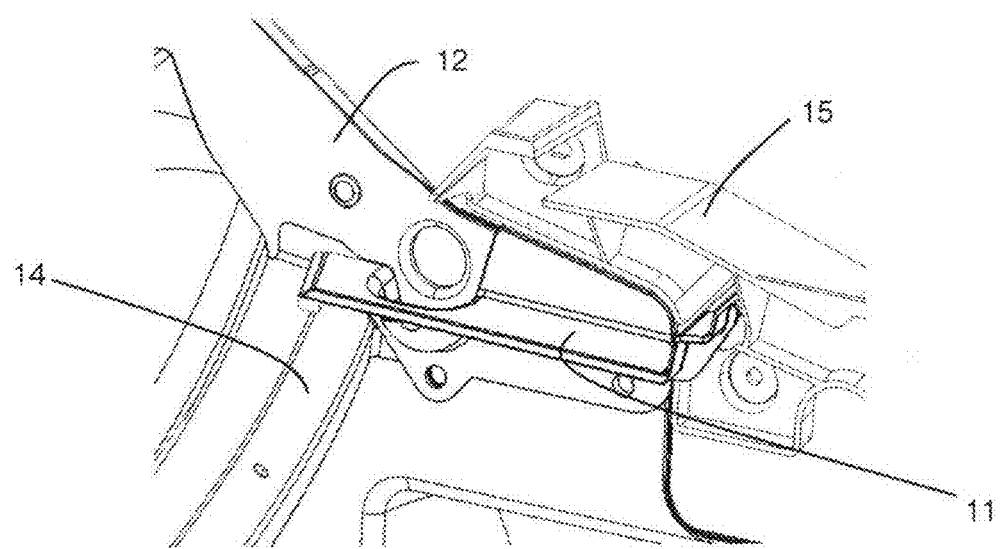
Figure 4:
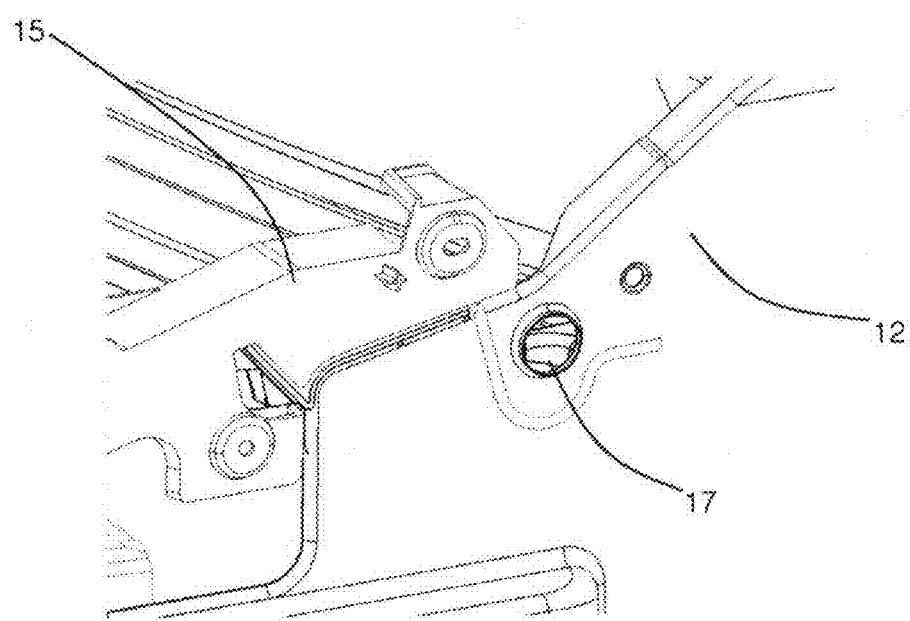

Referring notably to FIGS. 2 and 3, each end element 11 includes on the side directed toward the body element to which it is fixed a concave shape 16 adapted to channel in the transverse direction Y the outflow from the water box of water collected by the central element 10. The channeling and outflow direction is therefore not along Z. The arrangement that includes on the one hand the supports 15 and on the other hand the body elements to which the water box is fixed at least by its end elements 11 additionally includes a pipe for discharging water outflowing via the concave shape 16. This discharge pipe intended to convey the water to the engine compartment located under the water box is equipped with a closure flap 17 at the level of the body element to which the end element 11 is fixed. Here it is the A pillar liner 12 that is equipped with the flap 17. Water then flows into the space between the A pillar liner 12 and the lateral fender of the vehicle. The flap 17 is intended to prevent engine noise problems.

As previously indicated, the arrangement includes two hood supports 15 intended to support the hood providing access to the engine compartment and disposed on either side of the central element 10 in the longitudinal direction W of the water box, i.e. in the direction Y transverse to the body.

As shown in FIGS. 1 to 4, each end element 11 is separate from any hood support 15. The arrangement then advantageously includes waterproofing elements 19 disposed between the supports 15 and the end elements 11.

Figure 5:
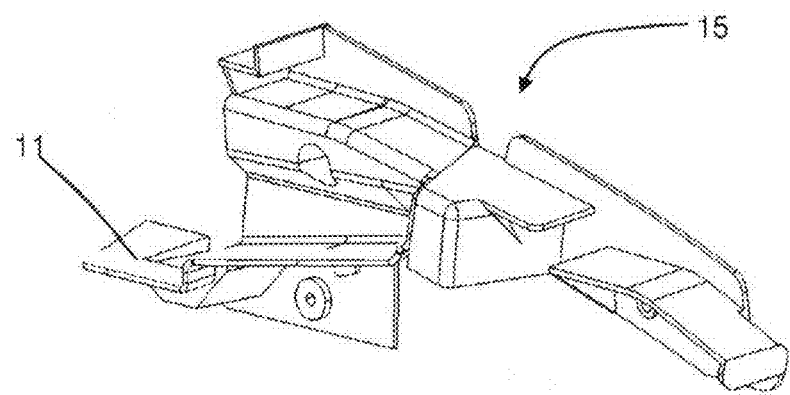
Figure 6:
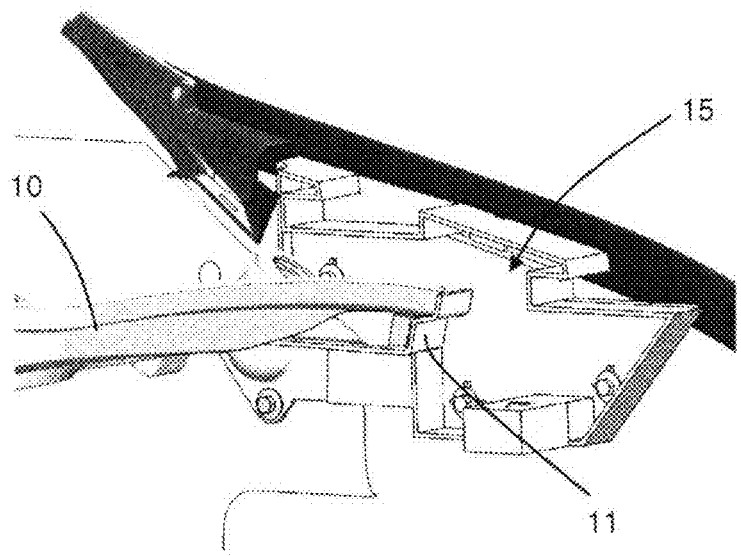

Nevertheless, and referring to FIGS. 5 and 6, to guarantee a zero distance between a given end element 11 and the support 15, a lateral edge of each end element 11 may instead be in one piece with a hood support 15. As a result each hood support 15 is formed in one piece with an end element 11.

The invention claimed is:

1. An arrangement comprising:

elements of a body of a motor vehicle, or pillar liners and/or lateral fender liners on which hood supports are mounted; and a water box configured to collect water flowing over a windshield of the vehicle and to separate the water from air to be routed into a ventilation circuit of the vehicle, the water box having a general shape of a gutter extending transversely to a longitudinal direction of the vehicle, at ends of which water is discharged, wherein the water box includes a central element and two end elements for closing the water box, each end element being connected to a respective longitudinal end of the central element, each end element extending toward an interior of the vehicle, along a direction transverse to the body of the vehicle, beyond an interior edge of each corresponding hood support, and each longitudinal end of the central element does not extend as far toward an exterior of the vehicle as the interior edge of each corresponding hood support to allow the central element to pass between the hood supports when mounting the central element along a path substantially inscribed in a vertical plane longitudinal with respect to the body of the vehicle, and wherein each end element is separate from any hood support.

2. The arrangement as claimed in claim 1, wherein each end of the central element bears on an upper face of each corresponding end element, an overlap zone extending at least 7 mm along the direction transverse to the vehicle.

3. The arrangement as claimed in claim 2, wherein the overlap zone is at most 20 mm along the direction transverse to the vehicle.

4. The arrangement as claimed in claim 1, wherein each end element has a dimension along the transverse direction that is less than 150 mm.

5. The arrangement as claimed in claim 1, wherein a ratio of lengths of the central element and each end element is greater than 10, the lengths being considered in the direction transverse to the body of the vehicle.

6. The arrangement as claimed in claim 1, wherein the central element and the end elements are made of plastic material.

7. The arrangement as claimed in claim 1, further comprising sealing means provided between:

the central element and the end elements, and/or the central element and a firewall upper crossmember of the vehicle to which it is fixed, or by at least one screw extending in a plane perpendicular to the direction transverse to the vehicle, and/or the end elements and the body elements to which they are fixed.

8. The arrangement as claimed in claim 1, wherein each end element is fixed to a corresponding end of the central element by at least one screw engaged with the two elements.

9. The arrangement as claimed in claim 1, wherein each end element includes, on a side directed toward the body element to which it is fixed, a concave shape configured to channel in the transverse direction outflow from the water box of water collected by the central element.

10. The arrangement as claimed in claim 1, wherein the central element of the water box includes an opening for each corresponding windshield wiper spindle of the motor vehicle.

* * * * *